United States Patent

Bailey, Jr. et al.

[15] 3,660,230

[45] May 2, 1972

[54] NUCLEAR REACTOR CONTROL SYSTEM

[72] Inventors: Herbert S. Bailey, Jr., Mountain View; Samuel L. Stewart, Campbell, both of Calif.

[73] Assignee: General Electric Company

[22] Filed: Nov. 26, 1968

[21] Appl. No.: 779,132

[52] U.S. Cl. ........................................... 176/36 R, 176/86 R
[51] Int. Cl. ............................................................. G21c 7/10
[58] Field of Search ........................................ 176/22, 33–36, 176/86

[56] References Cited

UNITED STATES PATENTS

| | | | |
|---|---|---|---|
| 2,952,600 | 9/1960 | Newson | 176/35 |
| 3,103,477 | 9/1963 | Mong | 176/86 X |
| 3,103,479 | 9/1963 | Ransohoff | 176/86 |
| 3,198,709 | 8/1965 | Macomber | 176/36 X |
| 3,406,093 | 10/1968 | Galli de Paratesi et al. | 176/36 |

OTHER PUBLICATIONS

ANL-5923, October 1958, pp. 7–9, 18–23 and 32.

*Primary Examiner*—Carl D. Quarforth
*Assistant Examiner*—Harvey E. Behrend
*Attorney*—Ivor J. James, Jr., Samuel E. Turner, John R. Duncan, Frank L. Neuhauser, Oscar B. Waddell and Melvin M. Goldenberg

[57] ABSTRACT

A nuclear reactor control system is described in which reactivity in the core is controlled by neutron absorbing material which is moved into and out of the fuel containing core region. Neutron moderating material is included in followers connected to the neutron absorbing control elements so that the moderating material is brought into the core fuel region when the neutron absorbing material is removed therefrom. This system is especially applicable to a reactor of the fast neutron breeder type. The use of moderating material in a fast reactor core improves the inherent safety characteristics of the core by improving the Doppler reactivity effect and coolant voiding reactivity. The incorporation of the moderating material in control material followers results in improvement in core fissile requirement, breeding ratio and core conversion ratio.

1 Claims, 5 Drawing Figures

INVENTORS
HERBERT S. BAILEY, JR.
SAMUEL L. STEWART

BY John R. Duncan
ATTORNEY

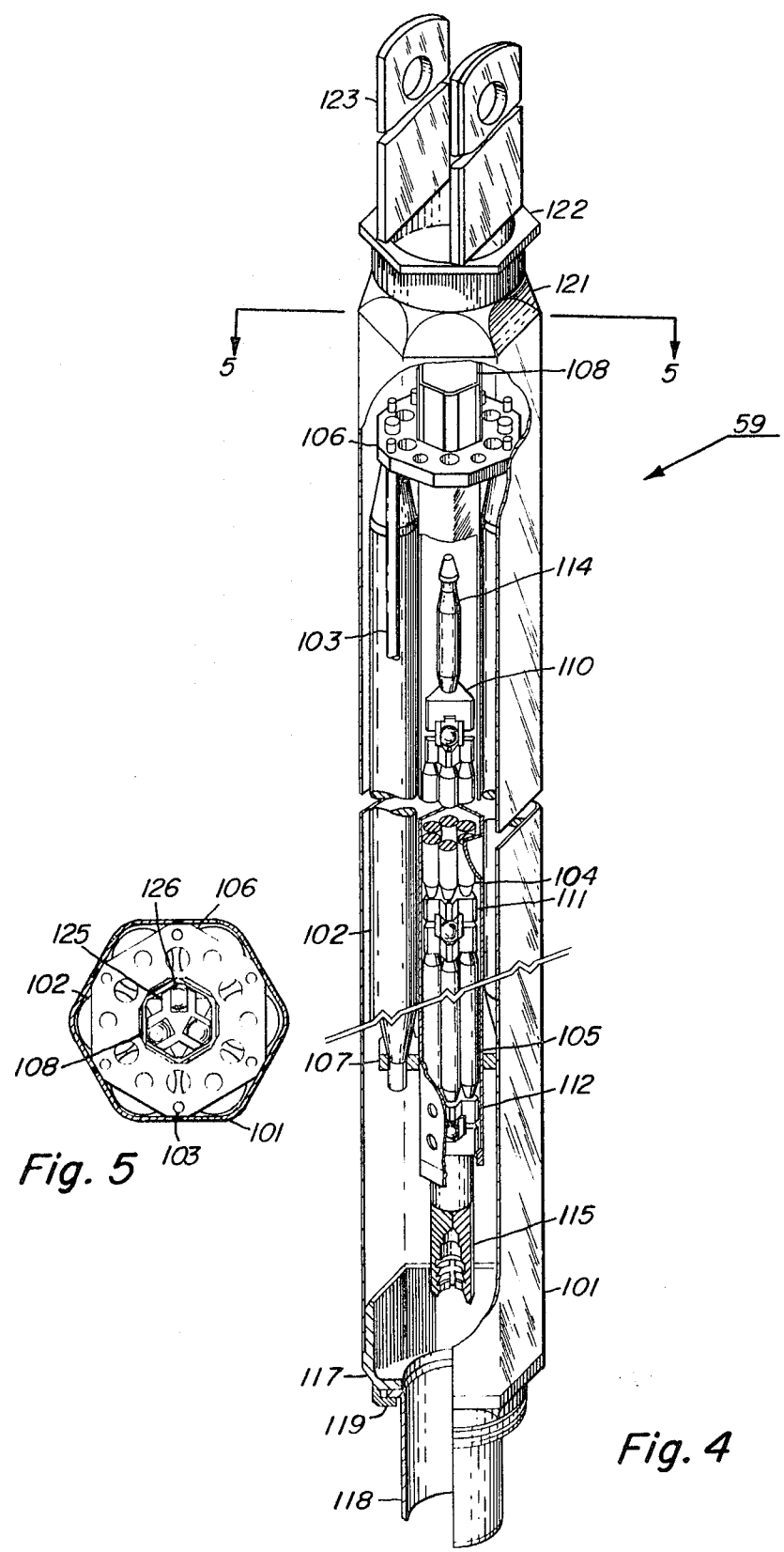

NUCLEAR REACTOR CONTROL SYSTEM

BACKGROUND OF THE INVENTION

Nuclear chain fission reactions and the reactors in which they take place are now well known. The typical reactor includes a chain reacting assembly or core including fissile nuclear fuel material contained in fuel elements. The fuel material is generally encased in corrosion-resistant heat conductive containers or cladding. The reactor core, made up of a plurality of these fuel elements in spaced relationship, plus control rods or blades, reflector elements, in-core instrumentation, etc., is enclosed in a container or shroud through which the reactor coolant flows. As the coolant passes between the spaced fuel elements, it is heated by thermal energy released in the fuel during the fission reaction. Reactivity of the fuel and resulting thermal energy output thereof, is increased by withdrawing the control rods to the desired degree from the fueled region of the core. Heated coolant leaves the reactor, the heat energy is used to perform useful work such as by driving a turbine-generator set to produce electric power and the now-cooled coolant is recycled back to the reactor. In a typical commercial power reactor, the coolant is water which may be heated under pressure or evaporated in the core. These reactors include a large amount of moderating material to thermalize the neutrons. Recently, reactors have been developed which use fast neutrons to maintain the chain fission reaction. Typically, these reactors may use steam or a liquid metal, such as liquid sodium, as the coolant. These reactors often include a quantity of a fertile material which is converted to a fissionable material during reactor operation. These breeder reactors are thus able to, under proper circumstances, produce more fissionable material than they consume.

Prior fast-neutron reactor designs have been largely a compromise among various conflicting variables. In order to maintain desirable inherent safety characteristics, various special core configurations, such as extreme pancaking or annular configurations, have been developed. Small amounts of moderating materials have been included in the core to insure a sufficiently negative Doppler effect. The Doppler effect is related to the energy distribution of the neutrons in the reactor. Other requirements of safety and efficiency have influenced reactor design. For example, it is desirable that control rods enter the core from the top so that gravity will aid entry. However, it is desirable that the coolant channels be designed for upward flow so that when the reactor is shutdown coolant can be circulated in part by natural convection (upward) circulation. Also, it is desirable that the control drives enter through the bottom of the reactor vessel rather than through the head of the vessel to simplify head removal for repair or refueling of the reactor core. It is further desirable that the flow of coolant pass the control rods tend to move the rods into rather than out of the core since the hydraulic forces on the rods may more than overcome gravitational forces.

In many prior reactor designs, it is necessary to direct a portion of the incoming coolant through non-fueled elements, such as control rods and instrumentation to cool them, instead of passing through the core. While including a portion of moderator material in a fast-neutron reactor core is advantageous from the point of view of improving the Doppler effect, it is disadvantageous since it occupies core volume which would preferably be occupied by fuel material. This results in increases in the core volume and core fissile material requirement together with a decrease in the breeding ratio and core conversion ratio. In addition, when the control rods are entirely or substantially entirely removed from the fuel region of the core, the space which had been filled by the control material is generally occupied by additional coolant or by steel followers. In the case of a liquid metal cooled reactor, increasing the quantity of coolant within the core is often undesirable since it increases the quantity which could be expelled in an emergency. Steel followers are generally undesirable since they increase the quantity of neutron absorbing material within the core.

While many of the prior reactor core systems have provided adequate efficiency and safety, there is a continuing need for improvements in reactor control systems to further enhance safety and reliability of the reactor.

SUMMARY OF THE INVENTION

It is, therefore, an object of this invention to provide a nuclear reactor control system overcoming the above-noted problems.

Another object of this invention is to provide a fast-neutron reactor control system of improved reliability, simplicity and safety.

Another object of this invention is to provide a fast-neutron reactor control system which increases the core conversion and breeding ratio while decreasing core volume and core fissile material requirements.

Still another object of this invention is to provide a fast-neutron control system which improves the reactor Doppler reactivity and coolant voiding reactivity effects while minimizing in-core structural materials.

The above objects, and others, are accomplished in accordance with this invention, basically, by providing a reactor control system in which at least some of the control assemblies include a section including neutron absorbing material to control reactivity within the fuel region of a reactor core and a neutron moderating section connected to the neutron absorbing section as a follower which moves into the fuel region of the core as the neutron absorbing section is withdrawn therefrom. In a preferred embodiment, the control system includes both "scram" and "shim" control assemblies. The scram assemblies are used primarily for reactor shutdown, either scheduled shutdowns or emergency shutdowns. The scram control assemblies are fully inserted in the core fuel region during reactor shutdown and are fully removed therefrom during normal reactor operation. Thus, moderating followers on scram control assemblies are fully inserted in the core fuel region during normal reactor operation. Shim control assemblies are fully inserted in the core fuel region during reactor shutdown. The shim control assemblies are gradually withdrawn during reactor startup until reactivity reaches the desired point. Reactivity and, therefore thermal output, in the core is adjusted by moving these shim control rods slightly into or out of the core fuel region. While the major portion of the required moderating material is incorporated in the scram control rod followers, it is also desirable that the shim control rods have moderating followers. In liquid metal cooled reactors where the coolant void reactivity effect is sensitive to the fission product and plutonium-240 content, the coolant void reactivity effect is less negative at the end of a fuel cycle when the fission product content is highest. This would be compensated for by the increased moderator content at the end of the cycle when all of the shim control rods are substantially entirely withdrawn.

Also, backup control systems are particularly well-suited for the incorporation of the moderating followers of this invention. A backup control system is a second set of control rods which is capable of making and holding the core subcritical in the event that the primary system is inoperable. The moderating followers according to this invention will utilize the normally vacant in-core locations required to insert the backup control rods.

While this system, as a whole, is especially useful with a reactor of the fast-neutron breeder type, the concept has utility in many other types of reactors. While the following description of a preferred embodiment describes the present invention in the context of a steam-cooled fast-neutron reactor, this is merely exemplary of the reactor systems in which this invention is useful.

BRIEF DESCRIPTION OF THE DRAWINGS

Details of the invention and of a preferred embodiment thereof will be further understood upon reference to the drawings, wherein:

FIG. 4 is an isometric, partly cut away and somewhat shortened for clarity, of a control assembly according to this invention;

FIG. 5 is a section through the control assembly, taken on line 5—5 in FIG. 4.

DETAILED DESCRIPTION OF THE INVENTION

Figure 1:
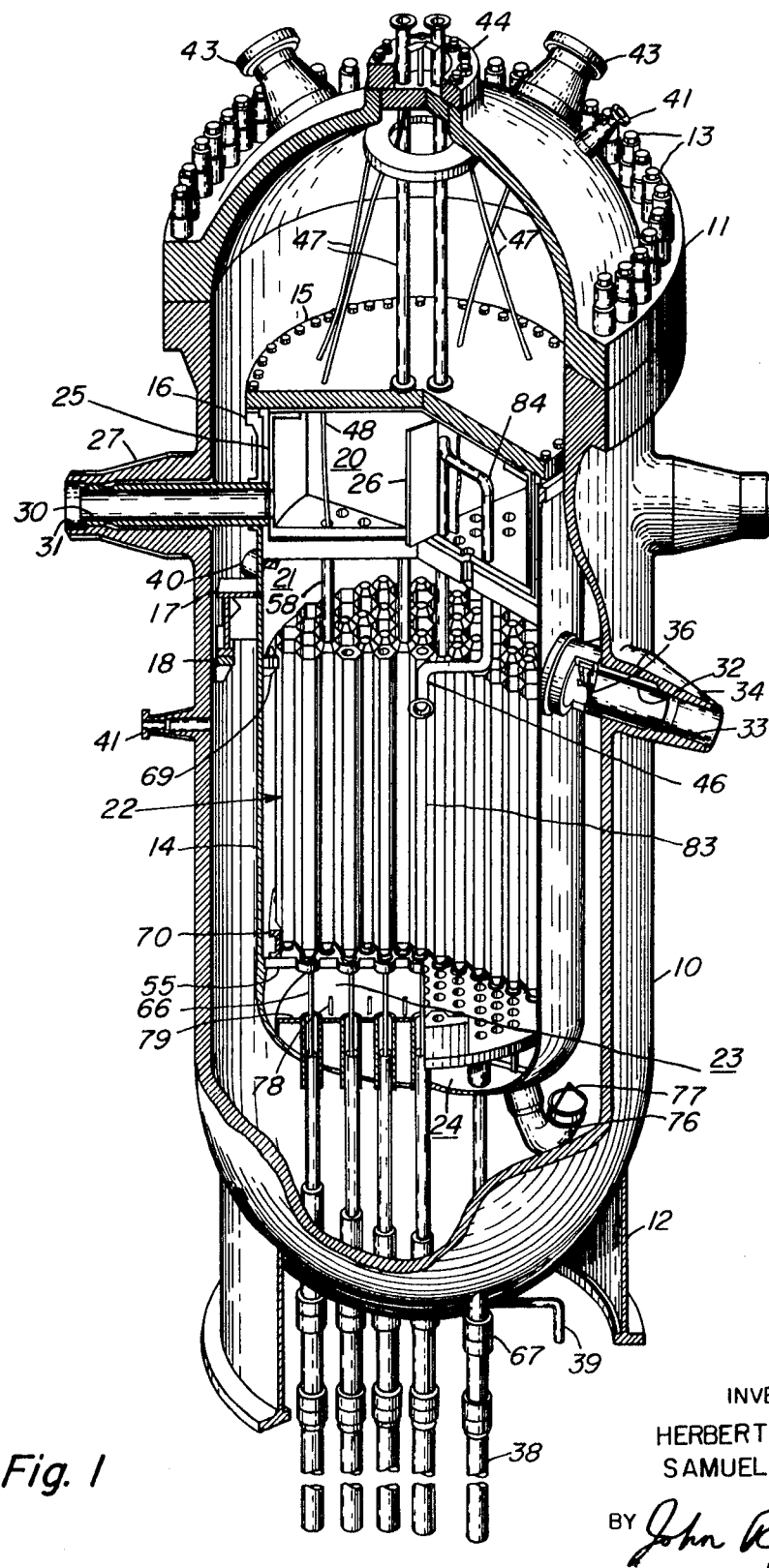
FIG. 1 is an isometric view, partially cut away and somewhat simplified for clarity of a steam-cooled nuclear reactor incorporating the control system of this invention.

Referring now to FIG. 1, there is seen a simplified perspective view of a nuclear reactor including an open topped pressure vessel 10 closed by a head 11. Pressure vessel 10 is supported by a skirt 12 for mounting on a suitable foundation (not shown). Head 11 is secured to pressure vessel 10 by a plurality of bolts 13.

Within pressure vessel 10 is mounted an open-topped shroud 14 closed by a closure flange 15 seated on shoulder 16. Shroud 14 is supported by means of annular support 17 resting on an inwardly projecting ring shaped number 18 on the inner wall of pressure vessel 10. Annular support 17 is not rigidly fastened to ring 18 so that a slight amount of slippage is permitted to compensate for differing thermal expansion of shroud 14 and pressure vessel 10 during reactor heat-up and cool-down.

Within shroud 14 are contained a superheated steam outlet plenum 20, a saturated steam inlet plenum 21, and a core and blanket space 22, a lower steam plenum 23 and a flooding water inlet plenum 24.

Outlet plenum 20 is closed at the top by closure flange 15 and at the sides and bottom by exhaust divider and hold-down 25 which includes vertical dividing plates 26 which divide outlet plenum 20 into a plurality of pie-shaped segments. Superheated steam leaves each of the plenum segments through a superheated steam outlet 27. Typically, there may be six plenum segments and six outlets. Each of outlets 27 consists of an inner sleeve 30 secured to shroud 14 and in slidable sealing engagement with an outer sleeve 31. This permits the two sleeves to slide with respect to each other to compensate for differential thermal expansion.

Saturated steam enters inlet plenum 21 through a similar arrangement of slidable inner sleeve 32 secured to shroud 14 within an outer sleeve 33, the combination of which makes up a saturated steam inlet 34. Typically, three such inlets may be arranged to deliver saturated steam to inlet plenum 21. A check valve 36 is located in each inner sleeve 32 to prevent loss of steam through inlet 34 should the saturated steam supply fail for any reason.

A plurality of control rod drives 38 penetrate the bottom of pressure vessel 10 and shroud 14. Only a few of the many control rod drives which would be used in a typical reactor are indicated in FIG. 1, for clarity.

The space between the inner wall of pressure vessel 10 and shroud 14 is kept substantially filled with water during reactor operation. This provides neutron shielding and a convenient source of water to flood the core when the reactor is shut down. Water is admitted to this space through a shield and flood water inlet 40. Openings 41 are provided for instrument for monitoring and controlling the water level within pressure vessel 10. A cleanup line 39 is provided at the bottom of pressure vessel 10 to drain water therefrom, when desired.

Instrumentation outlets 43 and seal plug 44 are provided for the admission of steam sample lines, thermocouple connections, etc., into pressure vessel 10.

Figure 2:
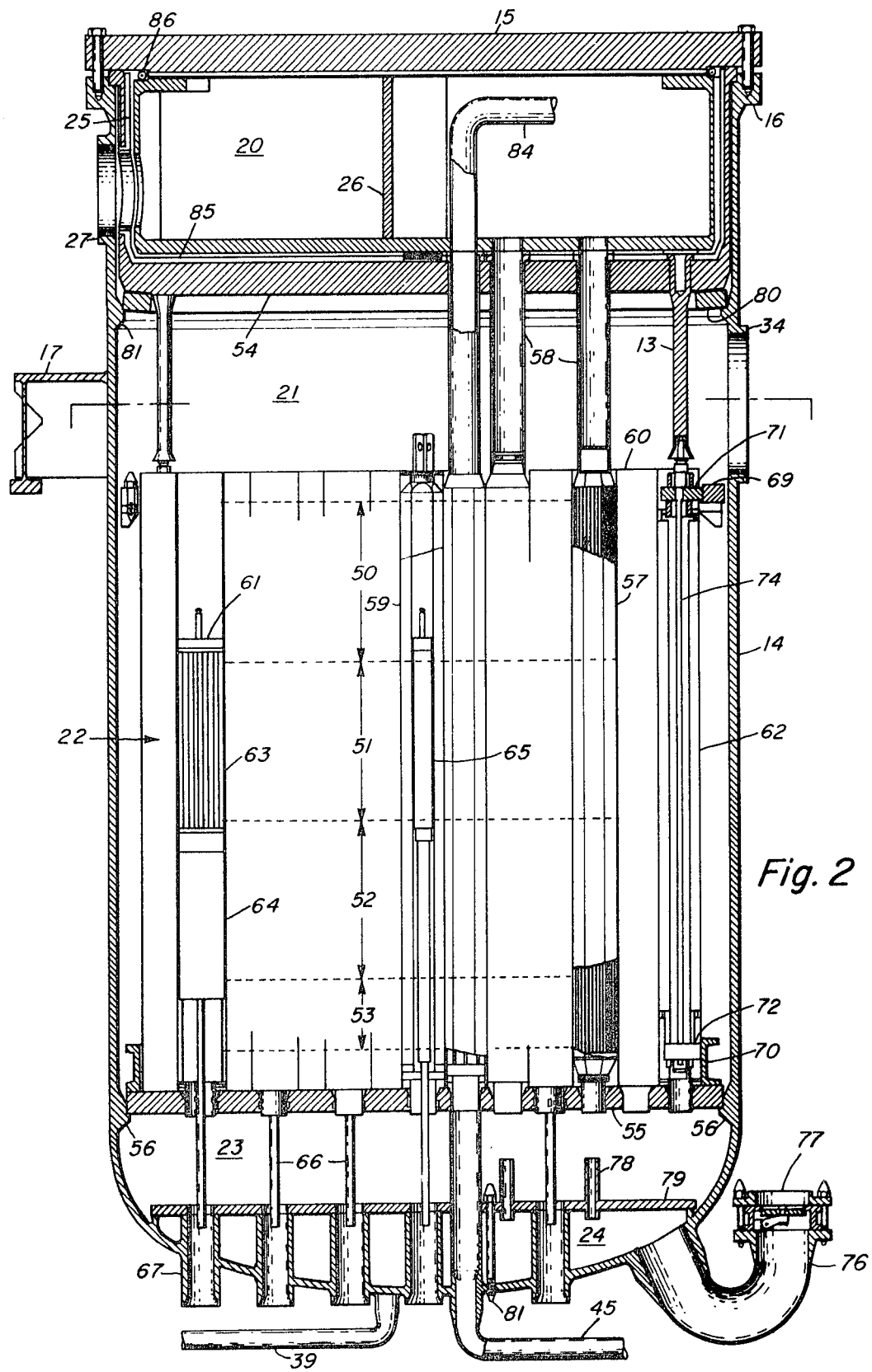
FIG. 2 is a vertical section through the core shroud containing the reactor internal components.

If desired, one test fuel assembly 83 may be provided with an individual steam inlet line 45 (as seen in FIG. 2) and superheated steam outlet line 46 so that special fuel assemblies may be tested during reactor operation.

A plurality of instrumentation leads 47 enter pressure vessel 10 through instrumentation outlets 43 and seal plug 44. This reactor is unusually well adapted to permit individual sampling of steam output from each fuel assembly. A typical steam sampling line is shown at 48.

Figure 3:
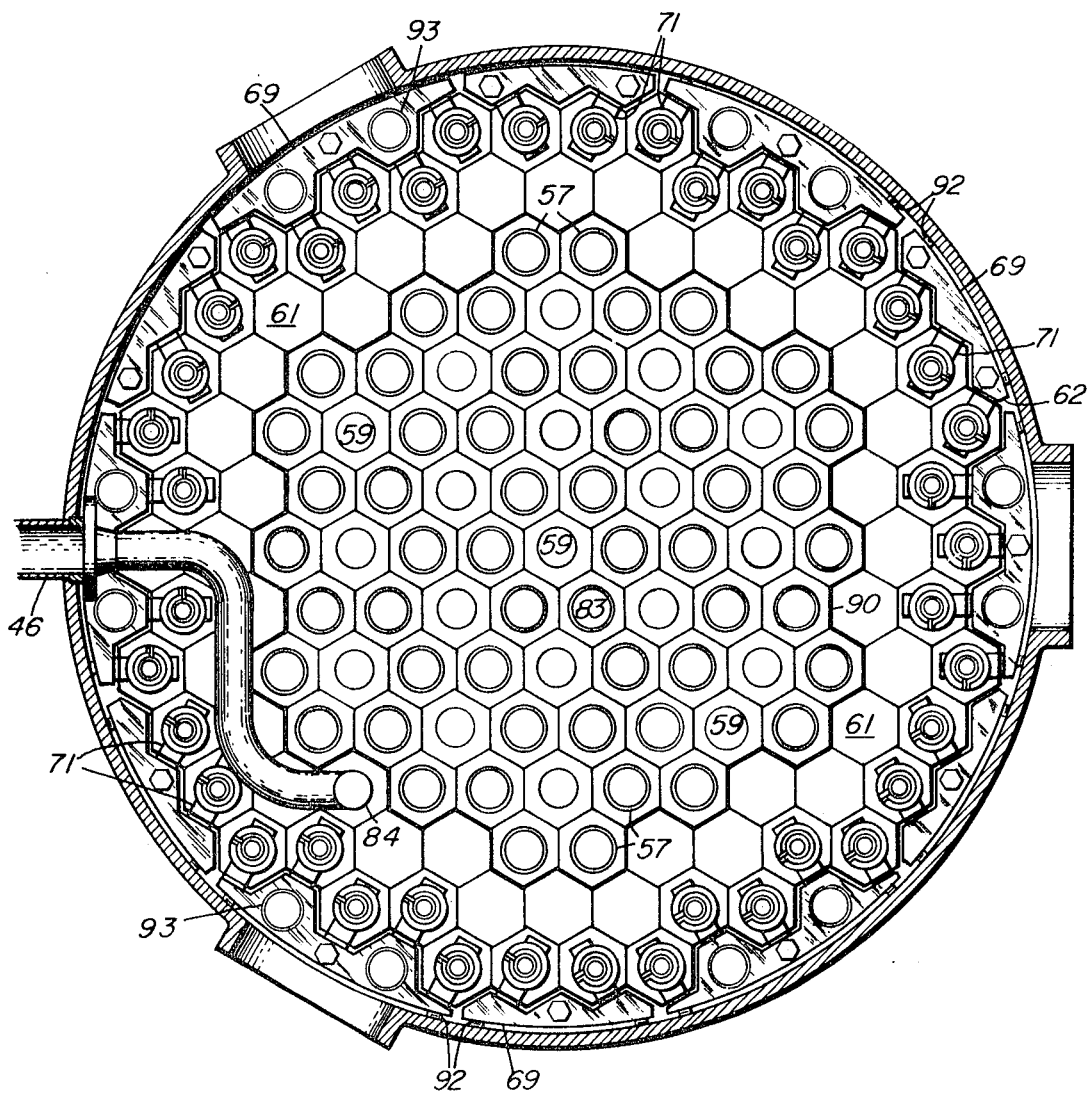
FIG. 3 is a horizontal section through the core shroud, taken on line 3—3 in FIG. 2.

Details of the arrangement of components within shroud 14 may best be understood by considering FIGS. 1 and 2 together. FIG. 2 shows a vertical section through shroud 14, somewhat simplified for clarity. While the core and blanket region contains many fuel subassemblies, control assemblies, reflector assemblies, etc., as seen in FIG. 3, only one of each is detailed in FIG. 2.

The overall reactor core 22 is divided axially into four sections, an upper blanket 50, an active fuel region 51, a lower blanket 52 and a gas plenum region 53. These sections are illustratively divided by dashed lines in FIG. 2. Radially, the overall reactor core 22 is divided into two sections, as best seen in FIG. 3. The central section consists fo fuel sub-assemblies 57 and control assemblies 59 while the outer ring-shaped section consists of reflector assemblies 60, reflector-clamp assemblies 62 and reflector-control assemblies 61.

All of the sub-assemblies which make up overall core 22, except the fuel sub-assemblies, are supported at this lower end by core plate 55, which is in turn supported by an inwardly projecting shoulder 56 on shroud 14. As is further described below, these non-fuel assemblies are primarily made up of multi-rod sub-assemblies which permit saturated steam to flow downwardly through them from inlet plenum 21 to lower steam plenum 23.

Each of the fuel assemblies 57 is secured to an orifice-seal assembly 58 which depends from seal plate 54. The fuel assemblies are thus held out of weight-bearing contact with core plate 55, although a cylindrical extension on each fuel assembly passes through holes in core plate 55 in sliding contact therewith. The spacing between the fuel assemblies and core plate 55 allows for thermal expansion of the fuel assemblies during reactor operation. The fuel assemblies are described in greater detail in copending U.S. Pat. application Ser. No. 778,999, filed concurrently herewith.

Reflector-control assemblies 61 include an upper control section 63 and a lower reflector section 64. Control section 63 includes a plurality of rods of a neutron-absorbing or "poison" material, such as boron carbides. Reflector section 64 includes a plurality of rods of a neutron reflecting material, such as nickel. In FIG. 2, the reflector-control assembly 61 is shown in the maximum control position, with the neutron-absorbing section adjacent fuel region 51. As assembly 61 is moved upwardly, control decreases as the neutron-absorber is replaced by neutron-reflector. Saturated steam passes downwardly through assembly 61, past the neutron absorbing and reflecting elements. This steam tends to both cool the assembly and aid gravity in moving the control section into the maximum control position.

Reflector assemblies 60 each consists of a plurality of spaced rods comprising a neutron-reflecting material such as nickel within a hexagonal shroud.

Control assemblies 59 described in detail below each include a plurality of spaced rods each containing neutron-moderating material surrounding a cylindrical core within which a control unit 65 made up of several neutron-absorbing rods is movable. Control unit 65 is shown in FIG. 2 in the maximum control location. To increase the reactivity within fuel region 51, unit 65 is raised. Saturated steam coolant passes downwardly through each control assembly 59, cooling the assembly and aiding gravity in moving unit 65 into the fuel region in the event of an emergency.

All of the control assemblies 59 and a reflector-control assemblies 61 are moved by conventional drive means (not shown) which connect to drive rods 66 through thimbles 67.

Around the outside of core 22 is located a ring of reflector-clamp assemblies 62. Around the upper and lower ends of core 22 are located an upper edge plate 69 and a lower edge plate 70, respectively. These plates conform to the irregular cylindrical shape of the core as shown in FIG. 3. Within each of the reflector-clamp assemblies 62 is located a plurality of spaced rods made up of a neutron-reflecting material, such as nickel and a pair of rams 71 and 72, adapted to be moved outwardly against upper and lower edge plates 69 and 70, respectively. As these rams move outwardly, the assemblies press inwardly, clamling core 22 tightly together. This prevents core movement during reactor operation which would result in undesired reactivity changes. A clamp hold-down rod 73 engages the upper end of a torque rod 74 in each reflector clamp assembly 62. The reflector-clamp assemblies are described in greater detail in copending U.S. Pat. application Ser. No. 779000, filed concurrently herewith.

During reactor construction, or after refueling, etc., the core is first assembled as shown. Then seal ring 80 is placed within shroud 14 in engagement with an annular, inwardly-projecting ridge 81. When seal plate 54 is lowered into place, it engages and deflects the inner edge of seal ring 80. This results in an excellent gas and liquid seal between the wall of shroud 14 and seal plate 54. Orifice-seals 58 are lowered into place then the fuel assemblies 51 are raised out of weight-bearing contact with core plate 55 and locked to orifice-seals 58.

Suitable tools are brought into engagement with ram drive rods 74 and operated to drive rams 71 and 72 outwardly to tightly clamp core 22 together.

Exhaust divider and hold-down 25 is lowered into place. This holds orifice-seals 58 and hold-down rods 73 tightly in place.

While most of the orifice-seals 58 align with openings in hold-down 25 to deliver superheated steam thereinto, one or more may align with an individual test loop outlet pipe 84. Thus, an individual test fuel assembly may be provided with independent saturated steam inlet 45 and outlet pipe 84. While in a strictly power reactor this test loop may be eliminated, this reactor design is exceptionally well adapted to having such a test facility included.

Thermal insulation 85 may be provided to decrease heat transfer from superheated steam outlet plenum 20 to saturated steam inlet plenum 21, if desired.

Finally, closure flange 15 is installed. A plurality of rollers 86 are provided between closure flange 15 and exhaust divider and hold-down 25 to permit pressure contact while allowing for differential thermal expansion.

As described above, when internal pressure within shroud 14 drops below a pre-set value, as during an emergency or during a reactor shutdown, the core is automatically flooded with water. One of several flooding values 76 is shown in FIGS. 1 and 2. When shroud internal pressure drops, check valve 77 opens, admitting water into flooding water inlet plenum 24. A plurality of flooding nozzles 78 are arranged on closure plate 79, in alignment with the fuel assemblies in core 22. Plate 79 is held in place by a plurality of bolts 81. Slight leakage through the shroud into plenum 24 is immaterial, since both spaces are water filled. Nozzles 78 immediately direct flooding water into the fuel assemblies to immediately begin cooling them. Since the flow of steam coolant during reactor operation is upward through the fuel assemblies, it is not necessary to reverse coolant flow during flooding. Also, flow of water through the fuel assemblies in the upward direction is aided by natural convection.

The overall reactor structure and internal components are described in further detail in U.S. Pat. application Ser. No. 778,998, filed concurrently herewith.

The layout of the various assemblies within overall core 22 is shown in FIG. 3, which is a horizontal section taken through shroud 14 on line 3—3. This typical overall core 22 includes 54 fuel assemblies, 53 of which are regular fuel assemblies 57, and one of which is a test fuel assembly 83. Of course, if desired, in a strictly power plant reactor all of the fuel assemblies could be conventional and the test loop could be eliminated. Conversely, if desired, additional test loops could be easily added to this reactor.

A heavy black line 90 schematically indicates the border between the fuel region and the radial reflector region. Within the fuel region, in addition to the above-mentioned fuel assemblies, are included 19 control assemblies 59, some of which are for backup control and others are reactor power level control. The reflector region includes 18 reflector-control assemblies 61, 18 stationary reflector assemblies 60 and 42 reflector-clamp assemblies 62.

The reflector-clamp assemblies 62 include movable upper rams 71 which bear against an interrupted upper edge plate 69 secured to the inner wall of shroud 14 by a plurality of adjustable bolts 92. Similar cooperating lower rams 72 and lower edge plate 70 are located at the lower end of reflector clamp assemblies 62, as best seen in FIG. 2. As ram 71 and 72 press outwardly, the clamp assembly shrouds tightly press the core together.

A plurality of down flow tubes 93 pass through edge plates 69 and 70 to aid in conducting saturated steam from saturated steam inlet plenum 21 to lower steam plenum 23. These tubes are sized so that part of the saturated steam passes downwardly through the non-fuel containing core assemblies (e.g., control and reflector assemblies) and part through down flow tubes 93. Each of the fuel assemblies 57 is connected to an individual orifice-seal 58 which conducts superheated steam upwardly from the individual fuel assembly to outlet plenum 20, as seen in FIGS. 2 and 3.

Typically, in a core configuration such as that shown in FIG. 3, 16 of the control assemblies 59 and 61 may provide shim control, with the remaining 21 control assemblies providing scram or backup control.

Each of the 16 shim mechanisms may be driven in conventional manner by a single phase induction brake motor through an integral speed reducer. Each motor drives a screw mechanism extending up into driving engagement with the lower connector on the control mechanism.

Each of the 21 scram or backup control mechanisms may be actuated in a conventional manner by means of a double acting hydraulic cylinder with a snubber at each end of the stroke. The hydraulic cylinder rod is coupled to the control rod extension shaft by a suitable coupling. Anti-rotation may be provided by eccentricity between the piston and the piston rod versus the cylinder bore. The rod may be cocked by metering pressure under the piston to overcome friction and gravity to raise the rod at a controlled rate. The control rod is scrammed by releasing the pressure supporting the control rod, thereby allowing the remaining forces to move the poison section of the control rod into the fuel region of the reactor core. Hydraulic forces within the hydraulic cylinder, gravitational forces on the control assembly, and hydraulic forces created by coolant passing downwardly around and through the control assembly combine to move the control assembly into the scram position. A cylinder snubber dissipates the kinetic energy of the control rod and connecting shafts at the end of the scram stroke. While this system is effective and reliable any other suitable drive system may be used to move the shim and scram control rods into and out of the fuel region of the reactor core.

Referring now to FIG. 4, there is seen an isometric view, partly cutaway and somewhat shortened for clarity, of a control assembly including moderating followers according to the present invention. This assembly is contained within a hexagonal shroud 101 generally similar to the shrouds surrounding the fuel and other core assemblies.

Control assembly 59 includes six fixed moderator rods 102, six fixed thermal poison rods 103 and seven movable poison rods 104. Typically, moderator rods 102 may comprise beryllium oxide, fixed poison rods 103 may comprise europium oxide and movable poison rods 104 may comprise tantalum. Each of the rods is desirably encased in a suitable cladding material, such as incoloy-800. Fixed rods 103 and 104 are supported by upper and lower rod mounting plates 106 and 107, which are secured to shroud 101 and which also support an inner sleeve 108.

The seven movable poison rods 104 are arranged for vertical movement within sleeve 108. Seven follower rods 105 containing, for example beryllium oxide, are provided which move into fuel region 51 (as seen in FIG. 2) when movable poison rods 104 are moved upward upwardly out of said region. The ends of these rod assemblies 104 and 105 are secured to end adapters 110, 111 and 112, each of which includes roller means bearing on inner wall of sleeve 108.

An extractor rod 114 is fastened to upper end adapter 110 to permit the removal of the movable poison rods 104 from the top of the control assembly, if necessary. A drive connector 115 is provided on lower end adapter 112 to which the control rod drive means (not shown) may be connected. Any suitable conventional drive means may be used, as desired. In the case of shim control rods, the drive will be capable of incrementally moving the rod between fully inserted and fully out positions. In the case of scram or backup control rods, the drive will be capable of moving the control assembly rapidly from a fully out to a fully inserted position. Typical conventional drives are described in U.S. Pat. No. 3020887, for example.

The lower end of shroud 101 is provided with a lower transition casting 117, and a nozzle 118 which is adapted to slidingly fit the holes in seal plate 55 (as seen in FIG. 2). Nozzle 118 is secured to transition casting 117 by a retaining ring 119 which permits slight relative transverse movement between nozzle 118 and shroud 101 to permit clearances between the various core subassemblies to be taken up by the core clamping assemblies.

The upper end of shroud 101 is provided with an upper transition casting 121, a turbulence baffle 122 and lifting plates 123.

The arrangement of moderating and poison rods, and guide rollers within assembly 59 is further illustrated in FIG. 5, which is a horizontal section taken on line 5—5 in FIG. 4, with extractor rod 114 and the upper half of upper end adapter 110 removed, for clarity. Upper rod mounting plate 106 within shroud 101 supports the ends of the six fixed moderating rods 102 and six fixed poison rods 103. Secured within plate 106 is intersleeve 108. Upper end adapter 110 carries a spider 125 on which three rollers 126 are mounted for rolling contact with the inner wall of sleeve 106. This permits the movable poison rods 104 and movable moderator rods 105 to be easily moved vertically within sleeve 106.

The above described assembly has been found to be especially effective in fast neutron breeder type reactors, cooled with a gas such as steam or liquid metal such as liquid sodium. The Doppler effect, relating to increasing neutron absorption with increasing temperature, is a useful safety factor in large fast reactors. The moderating material in rods 102 is included to increase the magnitude of the Doppler coefficient. The magnitude of the Doppler coefficient becomes larger as moderator is added because of the increased low energy neutron flux.

In a steam-cooled reactor, a material such as europium oxide is included in the fixed poison rods 123 to tailor the flooding reactivity effect. Reactivity increases when the core is flooded with water due to the moderating effect of the water and the increased thermalization of fast neutrons present. Europium decreases the flooding reactivity effect due to the preferential low energy neutron absorption cross section as the neutron spectrum is softened by the addition of water to the core.

In a liquid metal cooled reactor, the addition of moderator helps tailor the coolant voiding reactivity. In a liquid metal cooled fast reactor, it is desirable that reactivity automatically decrease when a portion of the coolant within the core is voided such as by boiling of the coolant. The addition of moderator to the core helps to make the coolant void reactivity more negative by reducing the change in neutron flux spectrum caused by voiding. In a reactor wherein two independent reactivity systems are required, each being capable of making and holding the core subcritical, the backup control system will be used only when the primary system is inoperable. Thus, during reactor operation the backup control poison rods will be entirely out of the core region. Thus it is especially convenient in this type of system to provide at least a portion of the moderating material as followers for the backup or scram control system poison rods. Also, in liquid metal cooled reactors where the coolant void reactivity effect is sensitive to the fission product and plutonium–240 content, it would be desirable to have some of the burn up or shim control rods with moderating followers. The liquid metal void reactivity effect is less negative at the end of a fuel cycle when the fission product content is highest. This could be compensated by the increased moderator content at the end of the cycle when all shim control rods are substantially entirely withdrawn.

Although specific arrangements and proportions have been described in the above description of a preferred embodiment, other suitable arrangements and components may be used as indicated above, with similar results.

Other modifications and ramifications of the present invention will occur to those skilled in the art upon reading the present disclosure. These are intended to be included within the scope of this invention.

We claim:

1. In a nuclear reactor core including a plurality of replaceable fuel assemblies and at least one replaceable control assembly, said control assembly comprising: an elongated tubular shroud adapted for flow of fluid therethrough; an elongated guide sleeve within said shroud; an axially movable control element within said sleeve, said control element including a first section containing neutron absorbing material and an axially spaced second section containing neutron moderating material; means for axially moving said control element so that said second section is moved into said core as said first section is moved out of said core; a plurality of fixed fast-neutron moderating elements located in said control assembly between said sleeve and said shroud; and a plurality of fixed thermal neutron absorbing elements located in said control assembly between said sleeve and said shroud.

* * * * *